United States Patent [19]

Camm

[11] Patent Number: 5,036,664
[45] Date of Patent: Aug. 6, 1991

[54] FLUID PRESSURE ACTUATOR WITH REMOVABLE PISTON AND CARTRIDGE UNIT

[75] Inventor: John J. Camm, East Malvern, Australia

[73] Assignee: Brake and Clutch Industries Australia Pty. Ltd., Victoria, Australia

[21] Appl. No.: 484,933

[22] Filed: Feb. 26, 1990

[30] Foreign Application Priority Data

Mar. 9, 1989 [AU] Australia ............................. PJ3135

[51] Int. Cl.⁵ ..................... B60T 17/22; B60T 11/28; F15B 7/08
[52] U.S. Cl. ........................ 60/534; 60/574; 60/588; 60/589
[58] Field of Search .............. 60/533, 534, 562, 574, 60/576, 585, 588, 589, 591; 92/169.1

[56] References Cited

U.S. PATENT DOCUMENTS

| | | | |
|---|---|---|---|
| Re. 31,080 | 11/1982 | Gaiser | 60/562 |
| 2,580,851 | 1/1952 | Seppmann | 60/585 X |
| 3,159,974 | 12/1964 | Rodgers | 60/562 |
| 4,132,073 | 1/1979 | Ewald | 60/562 |
| 4,161,105 | 7/1979 | Hagiwara | 60/562 X |
| 4,414,811 | 11/1983 | Gaiser | 60/589 |
| 4,455,830 | 7/1984 | Gaiser et al. | 60/574 X |
| 4,474,005 | 10/1984 | Steer | 60/589 X |
| 4,475,338 | 10/1984 | Gaiser | 60/589 X |
| 4,527,395 | 7/1985 | Gaiser et al. | 60/589 X |
| 4,685,300 | 8/1987 | Steer | 60/589 X |
| 4,685,301 | 8/1987 | Bacardit et al. | 60/562 |
| 4,718,234 | 1/1988 | Steer | 60/589 X |
| 4,790,138 | 12/1988 | Steer | 60/589 X |
| 4,887,517 | 12/1989 | Shinohara | 60/533 X |
| 4,945,729 | 8/1990 | Hayashida et al. | 60/562 |

FOREIGN PATENT DOCUMENTS

| | | | |
|---|---|---|---|
| 0088019 | 9/1983 | European Pat. Off. | 60/589 |
| 2459746 | 2/1981 | France | 60/562 |

Primary Examiner—Edward K. Look
Assistant Examiner—John Ryznic
Attorney, Agent, or Firm—Stevens, Davis, Miller & Mosher

[57] ABSTRACT

A fluid pressure actuator according to the invention is suitable for use as a master cylinder for a vehicle brake or clutch system. The actuator includes a housing having a bore extending therethrough and at least a primary piston movably disposed within the bore and extending out of the housing through one end thereof. The other end of the bore is closed by a removable end cap. A pressure chamber is defined within the bore between the end cap and the piston. Preferably a cylindrical cartridge is located within the housing and that cartridge defines the bore with which the piston is in engagement. The cartridge is removable from the housing when the end cap is removed and this facilitates maintenance or repair of the master cylinder. A fast fill seal assembly may be included on the piston and the actuator preferably a double piston and pressure chamber assembly with a secondary piston being located between the primary piston and the end cap.

21 Claims, 3 Drawing Sheets

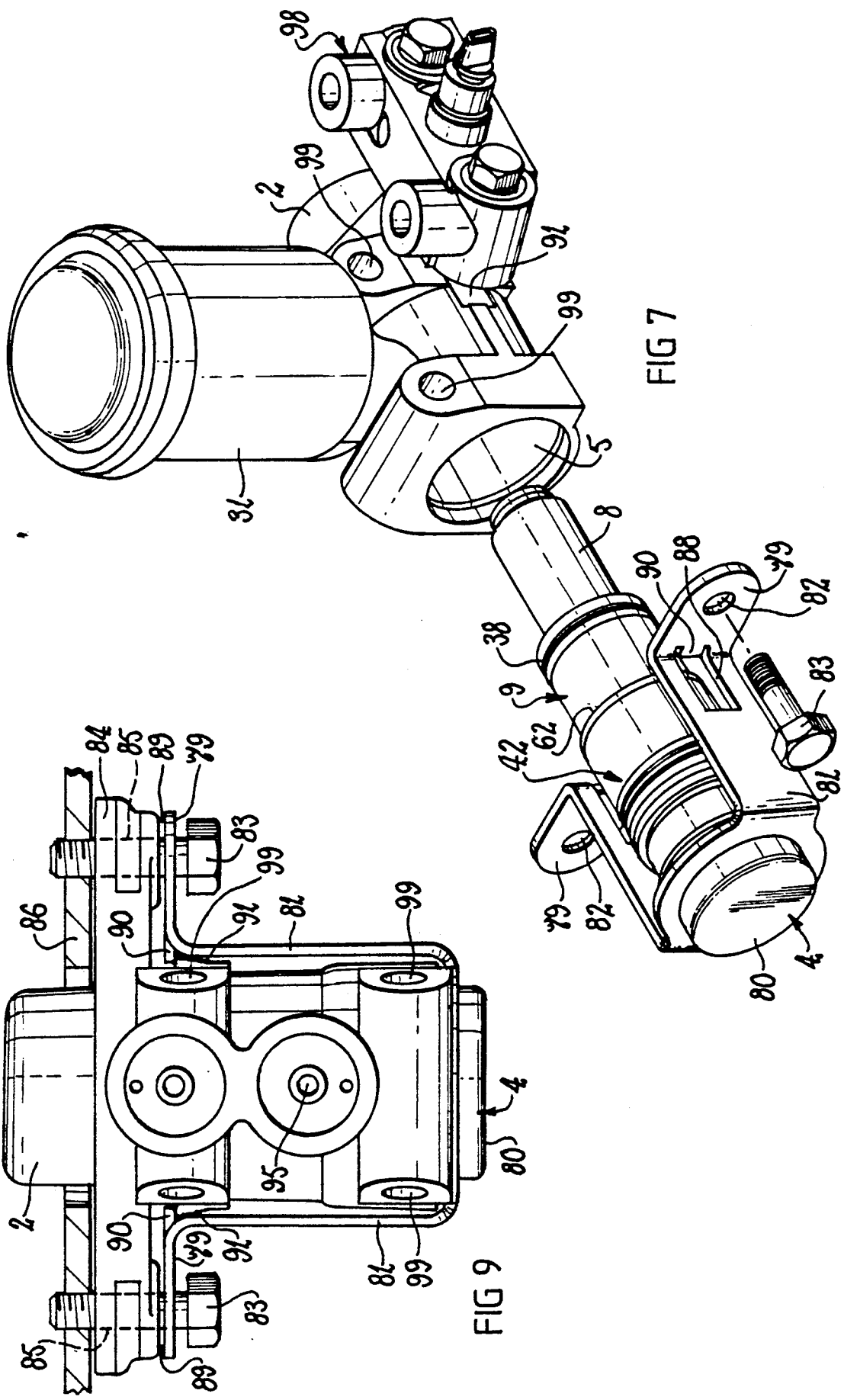

FLUID PRESSURE ACTUATOR WITH REMOVABLE PISTON AND CARTRIDGE UNIT

This invention relates to actuators of the kind which operate to pressurize a body of fluid which functions as a force transmitting medium between the actuator and something which is intended to respond to operation of the actuator. The invention is particularly although not exclusively concerned with such actuators which are used as master cylinders in vehicle brake and clutch systems. It will be convenient to hereinafter describe the invention with particular reference to such master cylinders and especially master cylinders of the fast-fill type.

Fast-fill master cylinders have a two stage operation. The first stage activates the relatively large diameter piston, of the master cylinder to quickly bring the associated brake system to the threshold at which actual operation of the brakes is imminent, and the effective operation of the brakes occurs substantially during the second stage. It is usual for such cylinders to have a primary piston and a secondary piston, each of which is operative to influence respective sections of the brake system. Also, the primary piston has two effective diameters, the larger of which is operative only during the initial conditioning stage of operation of the master cylinder.

Master cylinders of the foregoing kind are relatively complex in construction and involve a large number of components. In addition, they generally require use of relatively fine manufacturing tolerances to minimize the degree of lost or ineffective travel of an associated foot pedal for applying the brakes. Furthermore, conventional fast-fill master cylinders generally have a substantial length and therefore require a substantial space for installation.

It is sometimes a problem to reliably influence the primary piston to initially operate as a large diameter piston, and after the initial stage of operation has been completed, to operate as a small diameter piston. It will be appreciated that brake performance is a critical aspect of vehicle safety, and it is thus important that systems operate reliably and effectively for prolonged periods.

The maintenance of master cylinders has also proved to be a time consuming and labor intensive operation. Where master cylinders develop faults or require servicing after periods of prolonged use it is generally necessary to replace at least the seals within the cylinder. In prior art arrangements this has necessitated the removal of the master cylinder from the vehicle and dismantling thereof. This procedure can be undesirable since master cylinders are often located in inaccessible regions of the vehicle, and the various hydraulic lines which connect to the master cylinder need to be individually disconnected and re-connected resulting in a time consuming operation and possible leakage at joints after re-assembly.

It is an object of the present invention to provide a fluid pressure actuator which is of relatively simple and economic construction and which operates reliably. It is another object of the invention to provide an actuator which is usable as a fast-fill master cylinder for a brake system and which is constructed in such a way as to minimize lost or ineffective travel of components. A further object of the invention is to provide such an actuator which can be manufactured with relatively large tolerances without disturbing the ultimate effectiveness of the actuator when in use. A yet further object of the invention is to provide a simple and effective seal arrangement for a fluid pressure actuator. A further object of the invention is to provide an actuator which can be serviced in situ.

According to one aspect of the invention there is provided a fluid pressure actuator comprising a housing having a bore extending therethrough and at least a primary piston movably disposed within said bore and extending out of said housing through one end of said bore, the other end of said bore being closed by an end cap which is removable from said housing, a primary pressure chamber being defined within said bore between said primary piston and said end cap, movement of said piston towards said end cap arranged to cause an increase in pressure in fluid within said primary pressure chamber. According to a second aspect of the invention the fluid pressure actuator includes a removable cartridge which defines a bore within the housing of the actuator. A third aspect of the invention relates to the configuration of passages through the piston and a seal assembly associated therewith for forming a restricted fluid communication passage between opposite sides of the piston.

An embodiment of the invention is described in detail in the following passages of the specification which refer to the accompanying drawings. The drawings, however, are merely illustrative of how the invention might be put into effect so that the specific form and arrangement of the various features as shown is not to be understood as limiting on the invention.

In the drawings:

FIG. 5 shows an enlarged cross-sectional view of the seal arrangement at the interface between the primary and secondary chambers.

FIG. 6 shows a perspective view of the fluid pressure actuator shown in FIG. 1.

FIG. 7 shows an exploded perspective view of the actuator shown in FIG. 1.

FIG. 9 shows a plan view of the actuator and the mounting arrangement.

Figure 1:
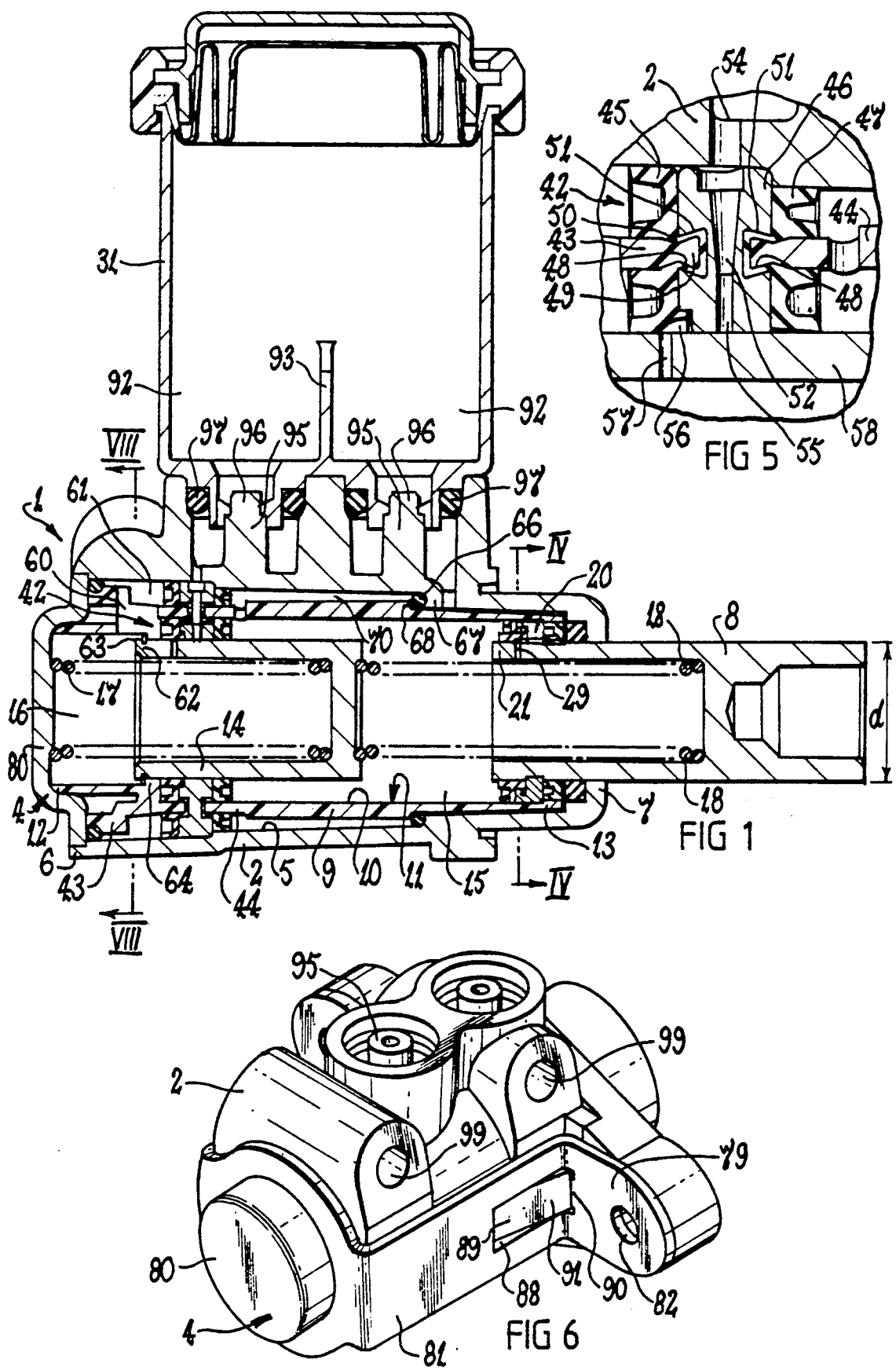
FIG. 1 shows a cross-sectional side view of a fluid pressure actuator according to the invention.

Referring initially to FIG. 1 of the drawings the example master cylinder 1 as shown includes a housing 2 and an end cap 4. The housing 2 may be manufactured from any suitable material although pressure die cast aluminum or moulded plastics materials are preferred. A chamber 5 is formed through the housing 2, that chamber 5 being open at each end 6, 7. The end cap 4 closes off end 6 while a primary piston 8 protrudes out of end 7. A cylindrical cartridge 9 is located within the chamber 5 and the inner surface 10 of this cartridge defines a bore 11 within the cartridge 9. The cartridge 9 is open at both ends 12, 13.

The master cylinder 1 shown in FIG. 1 is of the two piston type having the primary piston 8 extending out of the end 7 of the housing 2, and a secondary piston 14 located within the bore 11 between the end cap 4 and the primary piston 8 A primary pressure chamber 15 is formed within the bore 11 between the primary piston 8 and secondary piston 14, and a secondary pressure chamber 16 is formed between the secondary piston 14 and the end cap 4. Biasing springs 17 and 18 bias the pistons 14 and 8 respectively in a direction away from the end cap 4.

The primary piston 8 carries a seal arrangement 20 on the forward end 21 thereof. The seal arrangement 20 includes an annular elastomeric seal 22 with a skirt 23 which engages the surface 10 of the bore 11. The elastomeric seal 22 is held to the end 21 of the piston 8 by an interlocking arrangement 19 with a split ring 24 which is clipped into a groove 25 in the piston 8. The ring 24 is split as shown at 26 to assist in assembly of the piston 8 and for a pressure release facility as will be described in more detail herebelow.

Figure 4:
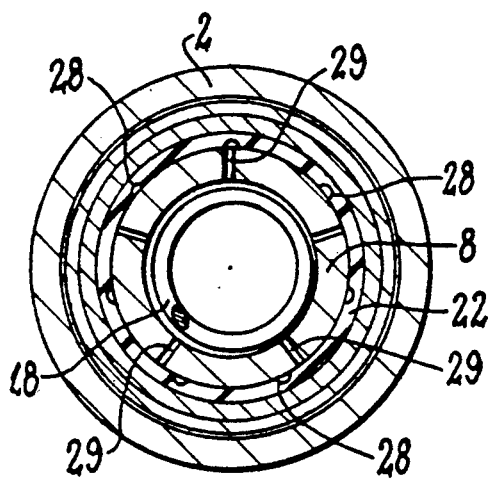
FIG. 4 shows a cross-sectional view along line IV—IV of FIG. 1.

A series of recesses or notches 28 are formed on the radially inner edge of the elastomeric seal 22, the notches 28 being evenly spaced around the seal. A series of radial passages 29 pass through the wall 30 of the piston 8 near the forward end 21 thereof at even spacing around the piston. There are preferably a different number of notches 28 in the ring. The arrangement of notches 28 and radial passages 29 are best seen in FIG. 4 of the drawings. In the arrangement shown there are seven notches 28 in the series and five radial passages 29 and the spacing is such that, no matter how the elastomeric seal 22 is rotated relative to the piston one, but only one, notch is in registry with one, and only one, radial passage 29. The diameter of all of the radial passages is restricted such that there can only be reduced fluid flow through the radial passage which is registry with the notch 28. It is preferred that, for the application depicted, the diameter of the radial passages is about 0.75 mm.

Figure 2:
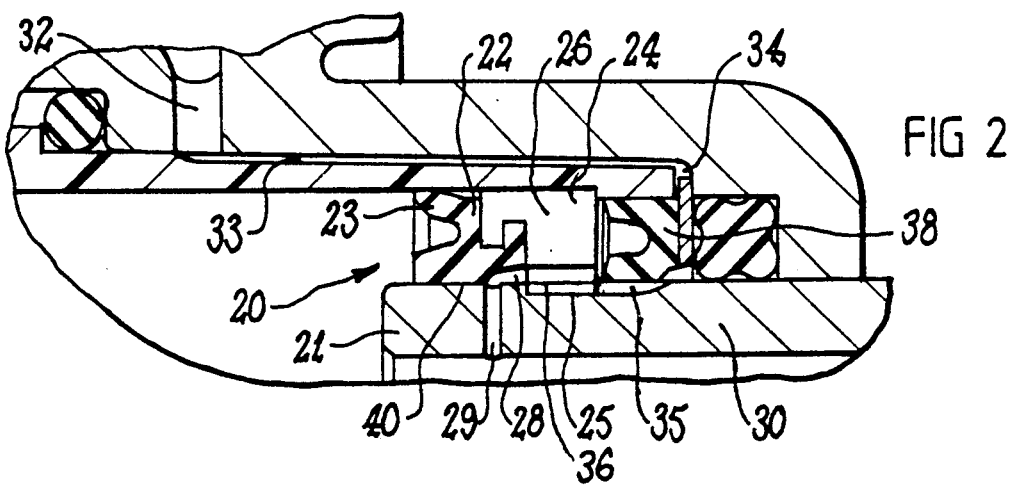
FIG. 2 shows an enlarged part cross-sectional side view of a seal arrangement for the primary pressure chamber of the actuator shown in FIG. 1, in a rest position.
Figure 3:
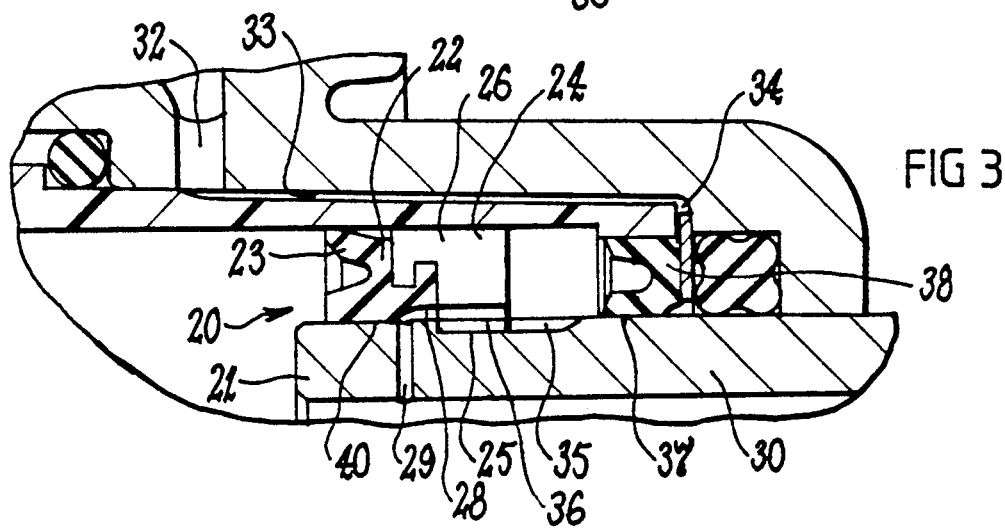
FIG. 3 shows a similar view to that of FIG. 2, but with the primary piston in a depressed position.

It will be appreciated that when the primary piston 8 is in a rest position, as shown in FIGS. 1 and 2, a fluid communication exists between a hydraulic fluid reservoir 31 for the master cylinder 1 and the primary chamber 15. That communication exists through outlet port 32 from the reservoir, along the passage 33 between the outer wall of the cartridge 9 and the housing 2, through port 34, through axial grooves 35 in the piston 8, through a groove 36 in the split ring 24, and through notch 28 and radial passage 29. When the piston 8 is depressed, as shown in FIG. 3, the grooves 35 move past the radially inner face 37 of annular seal 38 so that the seal 38 coacts with the piston 8 to prevent fluid flow back through the port 34. The seal 38 is fixed relative to the cartridge 9 while the seal 22 moves with the piston.

During the initial stages of the piston stroke the effective diameter of the piston 8 will be the diameter of the bore 11. As piston travel slows down fluid pressure will equalize on opposite sides of the seal 22 and the effective diameter of the piston 8 will reduce to the diameter of the piston body, that is, to the diamter "d" as depicted in FIG. 1. The effect of this is that during initial stroke the piston acts as a "fast fill" piston. The time taken for pressure to equalize on opposite sides of the seal 22 will depend on the diameter of the radial passages 29. It has been found that a diameter of between 0.5 mm and 1.0 mm is suitable with the preferred diameter being 0.75 mm.

In the event of rapid piston stroke, as could occur, for example, in emergency braking situations it is important that pressure in the chamber 15 does not rise too high. In such emergency situations as pressure increases above a predetermined value fluid will force its way through the other radial passages 29, past the radially inner face 40 of the seal 22 to thereby rapidly equalize pressure on opposite faces of the seal 22. It is envisaged that this pressure equalization will occur at between 500 and 750 kPa and the resilience of the seal 22 will be selected to ensure the inner face 40 is able to deflect to release fluid pressure from chamber 15 once this pressure is reached. The split ring 24 will be able to expand as necessary to accommodate this deflection.

Clearly, it is not essential that there be seven notches 28 and five radial passages 29. All that is essential is that, in any position of relative rotation between seal 22 and piston 8, a restricted number of the notches and radial passages are in registry with each other such that a restricted diameter fluid communication exists between opposite faces of seal 22 in all positions of relative rotation between seal 22 and piston 8. The limited number of notches 28 in the seal 22 ensures that the seal is well supported around its entire inner periphery, and the possibility of seal inward collapse under load is thus not a factor which needs to be considered as would be the case if the seal had a bevel extending around the entire inner periphery and there was only one radial passage.

The secondary piston is supported within the bore 11 by a secondary seal arrangement indicated at numeral 42. The cartridge 9 is preferably formed by two axially aligned substantially cylindrical components 43 and 44 which are joined together by the seal arrangement 42.

The seal arrangement 42 (see FIG. 5) preferably comprises a front seal 45, a bearing ring 46, and a rear seal 47. Both the front and rear seals 45 and 47 include an annular groove 48 and the opposed ends 49 of the cartridge components locate in those grooves to hold the cartridge assembled. Preferably, the grooves have a reduced dimensioned entrance and the opposed ends 49 of the components have a waisted form as depicted at 50, so that the components lock into the grooves when assembled. Likewise, the bearing ring 46 has a pair of grooves 51 on opposite faces thereof with reduced dimension entrances so that the seals 45 and 47 lock into the grooves 51.

Figure 8:
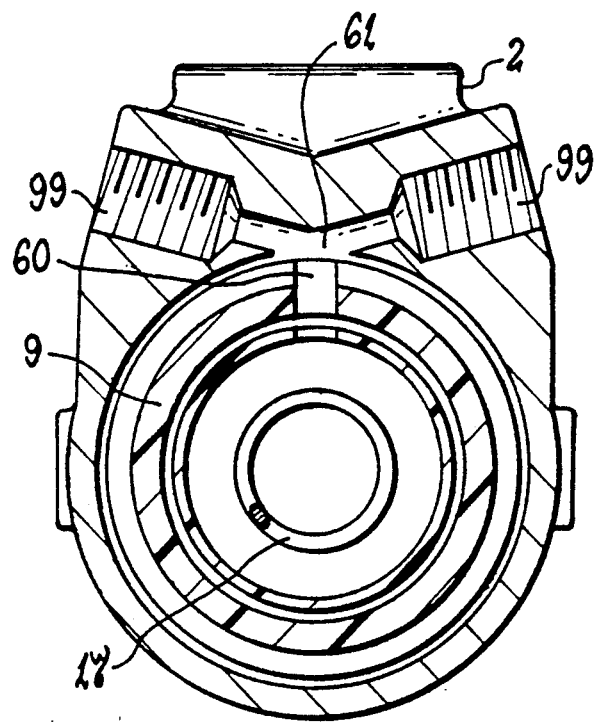
FIG. 8 shows a cross-section along line VIII-VIII in FIG. 1.

The bearing ring 46 defines a communication passage 52 between the reservoir and the secondary pressure chamber 16. The communication passage 52 is formed by port 54 in the housing, radial passage 55 in the ring 46, notch 56 in the front seal 45, and radial passage 57 through the wall 58 of the secondary piston 14. Both front and back seals 45 and 47 are fixed relative to the housing 2 so that when the piston 14 moves towards the end cap 4 the radial passage will move out of registry with the notch 56 to thereby close the communication passage. Pressurized fluid will pass out of the secondary chamber 16 through outlet port 60, into the annular space 61 between housing and cartridge, and to the brakes (not shown). FIG. 8 depicts the arrangement in more detail.

The front end 62 of the piston 14 carries a stop ring 63. That ring 63 abuts against a stop formation 64 formed on the inner surface of the cartridge 9 when the piston 14 is in its rest position. The interengagement between the stop ring 63 and stop formation 64 ensures positive positioning of the secondary piston when it is in its rest position (as depicted in FIGS. 1 and 5), and this allows the tolerances in components to be accurately selected. It will be noted that a relatively slight forward movement of the secondary piston 14 will move the radial passage 57 out of registry with the notch 56 so that pressurization of the chamber 16 occurs almost immediately when the piston 14 moves. Thus, there is relatively little lost travel and this allows the master cylinder as a whole to be of shorter dimension.

The front and back seals 45 and 47 (FIG. 5) are formed by a continuous web of elastomeric material. The radially inner edges of both seals seal with the secondary piston while the radially outer edges of both seals seal with the inner wall 65 of the housing chamber 5. Thus, even though in effect each of the front and back seals comprises two seals, no leakage through the seals is possible.

An O-ring seal 66 is interposed between a shoulder 67 in the housing chamber 5 and a shoulder 68 on the outer surface of the cartridge 9. The 0-ring seal 66 prevents pressurized fluid passing from the primary chamber 15 to the reservoir 31 through port 32. Pressurized fluid under braking conditions will pass from the primary chamber 15 through port 69 in the cartridge 9 to the annular space 70 between 0-ring seal 66 and back seal 47. From there the pressurized fluid will pass through outlet port 71 to the brakes (not shown).

It will be appreciated that servicing of the master cylinder 1 will be a simple matter. The end cap 4 will be removed from the housing 2 and an assembled unit comprising the cartridge 9 together with pistons 8 and 14 and seals will be withdrawn from the housing chamber 5. It will be noted that the housing chamber 5 has a passage of a slightly tapering configuration diverging from the end 7 to the end 6. This facilitates removal of the cartridge 9 from the chamber 5. Once the cartridge has been removed it can be inspected and any worn or damaged parts can be replaced. It is envisaged that the cartridge will be made from a high strength plastics material and in many circumstances it may be simplest to replace the assembled unit comprising used cartridge, seals and pistons with new components. The housing, however, will generally remain in situ and the fluid connections to the housing will remain undisturbed.

The manner in which the end cap 4 connects to the depict the preferred arrangement. As shown, the end cap 4 is formed from a single piece of metal plate formed into a substantially U-shaped component. The end cap has a disc shaped central portion 80 with a pair of arms 81 integral therewith. The central portion 80 may have a slightly domed form as shown. Clearly, it is not essential for the central portion 80 to be integral with the arms 81, but this is the preferred arrangement. Alternatively, the central portion may be separate from the arms, and the arms 81 may then act in the manner of a strap to hold the central portion to the housing 2.

As shown, the free ends of the arms 81 carry flanges 79 at substantially 90° thereto and those flanges 79 have holes 82 therein through which mounting bolts 83 pass in order to secure the master cylinder to a support 86. The housing may have wings 84 on each side thereof with holes 85 therethrough which align with the holes 82 in the flanges 79. The length of the arms 81 are selected such that when mounted to the support 86, but prior to the bolts 83 being tightened, a gap 87 (as indicated in FIG. 9) exists between the flanges 79 and the wings 84. When the bolts are tightened the flanges are moved into contact with the wings to compress the housing 2 between the central portion 80 and the support 86. That compression serves to ensure that the seals in the housing chamber 5 operate effectively, and that the assembly is tightly held in an assembled condition in use.

It is preferred that the arms 81 of the end cap 4 releasably engage with the housing 2 to hold the end cap to the housing. This can be achieved in various ways but as shown in the drawings the arms 81 preferably each have a rectangular recess 88 formed therein into each of which a tapered lug 89 formed on the side of the housing locates. A tongue 90 formed integral with each flange 79 clips behind the lugs 89 when the end cap is operatively located on the housing 2. To remove the end cap 4 from the housing 2 the arms 81 will be pulled apart to disengage the two tongues 90 from their respective lugs 89. When the end cap is brought into engagement with the housing the tongues 90 will ride up the sloping surfaces 91 of the lugs 89 and snap into engagement behind the lugs.

The reservoir 31 is preferably formed having two reservoir chambers 92 divided by a wall 93. The two chambers 92 supply compensating fluid to respective pressure chambers 15 and 16. Should failure occur in one or other of the systems supplied by pressurized fluid from the pressure chambers 15 and 16 the other system will continue to operate.

The reservoir preferably engages with upstanding studs 95 formed on the housing, and it is preferred that the reservoir simply clips to the heads 96 of those studs and is thereby held to the housing 2. If necessary the heads 96 can be deformed by a riviting process to clamp the reservoir 31 permanently to the housing. Seals 97 ensure that no leakage occurs between the reservoir and the housing.

It will be appreciated from the aforegoing that the actuator as described is suitable for a modular type of construction in that the cartridge 9, the housing 2 and the reservoir 31 are all formed independently of each other. The housing can have one or more pressure proportioning devices 98 fitted thereto, and it will be noted that the proportioning devices can be fitted to either the left or right side of the housing as outlet ports 99 are formed on both sides of the housing 2. This makes the actuator suitable for installation in a range of vehicles or other applications.

The manner in which the pistons coact with their respective seals ensures that there is only very limited lost travel of the pistons prior to the pistons being operative to pressurize fluid in the respective pressure chambers. If the fast fill seal arrangement 20 were omitted from the primary piston 8 the assembly as described could be constructed having a maximum stroke length of about 55 mm which is far more than comparable assemblies. The arrangement of the fluid communication passages ensures the actuator can be assembled by unskilled persons without there being the potential for the fluid communication passages being blocked.

Various alterations, modifications and/or additions may be introduced into the constructions and arrangements of parts previously described without departing from the spirit or ambit of the invention as defined by the appended claims.

HAVING NOW DESCRIBED OUR INVENTION WHAT WE CLAIM AS NEW AND DESIRE TO SECURE BY LETTERS PATENT IS:

1. A fluid pressure actuator comprising a housing having a bore extending therethrough and at least a primary piston movably disposed within said bore and extending out of said housing through one end of said bore, the other end of said bore being closed by an end cap which is removable from said housing, a primary pressure chamber being defined within said bore between said primary piston and said end cap, movement of said piston towards said end cap arranged to cause an increase in pressure in fluid within said primary pressure chamber, said end cap including at least one mounting bracket, and mounting means arranged to cooperate with said mounting bracket to hold said actuator to a support in use, and to hold said end cap to said housing.

2. An actuator according to claim 1 wherein there is a secondary piston movably disposed within said bore between said end cap and said primary piston, said primary pressure chamber being defined between said pistons, and a secondary pressure chamber being defined between said secondary piston and said end cap.

3. An actuator according to claim 1 wherein said mounting bracket is in the form of a pair of arms, said arms extending along opposite sides of said housing, each arm terminating in a laterally extending flange, said mounting means arranged to engage each respective flange to hold said actuator to said support.

4. An actuator according to claim 3 wherein said mounting means is adapted to compressively stress said housing between said end cap and said support when said actuator is operatively mounted to said support.

5. An actuator according to claim 1 wherein said end cap includes engagement means arranged to releasably engage with said housing such that when the actuator is disengaged from said support said engagement means holds said end cap engaged with said housing.

6. An actuator according to claim 5 wherein said engagement means comprises a clip which is arranged to automatically engage when said end cap is operatively pressed into engagement with said housing.

7. An actuator according to claim 3 wherein each said flange has a bolt hole therein, said housing carries a mounting wing on diametrically opposite sides thereof, said wings having bolt holes therein which correspond with the hole in said flanges, and said mounting means comprises a pair of bolts each of which is arranged to pass through respective holes in said flanges and wings and engage with a threaded bore in a said support to mount said housing to said support.

8. An actuator according to claim 7 wherein the arms have a length which is such that, prior to said mounting means operatively mounting the actuator to a support surface the flanges are spaced apart from said wings.

9. An actuator according to claim 1 wherein said bore is defined by a cartridge located within a passage in said chamber, said piston and said cartridge forming an assembled unit, said assembled unit being removable from said passage through said other end when said end cap is removed from said housing.

10. An actuator according to claim 9 wherein said cartridge is of cylindrical form formed by a cylindrical wall, and radial passages through said wall form fluid communication paths between at least one fluid reservoir supported by said housing and a pressurized fluid outlet from said housing.

11. An actuator according to claim 9 wherein seal means is interposed between said cartridge and said end cap to prevent fluid leakage from said bore past said end cap.

12. A fluid pressure actuator comprising a housing having a substantially cylindrical passage therein open at both ends, a bore extending therethrough defined by the inner surface of a cylindrical cartridge located in said passage, a primary piston movably disposed within said bore extending out of said passage through one end thereof, said piston and said cartridge forming an assembled unit, a removable end cap closing off the other end of said passage, a primary pressure chamber being defined within said bore between said piston and said end cap, removal of said end cap enabling said assembled unit to be removed from said passage.

13. An actuator according to claim 12 wherein there is a secondary piston movably disposed within said bore between said end cap and said primary piston and a secondary pressure chamber is defined within said bore between said end cap and said secondary piston, said secondary piston forming part of said assembled unit, fluid outlets being formed from said bore through said housing for the supply of pressurized fluid from said actuator.

14. An actuator according to claim 13 wherein said cartridge is comprised of at least two cylindrical parts joined together by seal means, said secondary piston engaging with said seal means to define said secondary pressure chamber.

15. An actuator according to claim 14 wherein said cartridge parts interlock with said seal means to ensure said cartridge is maintained in an assembled condition when said assembled unit is inserted into, or removed from, said passage in said housing.

16. A fluid pressure actuator comprising a housing having a bore therein in which a piston is movable, a pressure chamber defined within said bore, movement of said piston from a rest position into said chamber causing pressurization of fluid within said chamber, there being a pressurized fluid outlet from said chamber and a compensation fluid inlet into said chamber, said piston having a series of substantially radial passages therethrough for forming a fluid communication passage between said pressure chamber and said compensation fluid inlet, and an annular seal surrounding said piston and in contact with the radially outer surface thereof, said seal having a series of notches formed on the radially inner surface thereof spaced around the radially inner periphery of said seal, the number and spacing of said notches and radial passages being selected such that, at least when said piston is in its rest position, a restricted number of said notches are in registry with said radial passages to form said fluid communication passage.

17. An actuator according to claim 16 wherein there are a different number of radial passages and notches, said notches and radial passages being evenly spaced around said seal and piston respectively, and only one radial passage is in registry with one notch in any position of said seal on said piston.

18. An actuator according to claim 17 wherein there are seven notches and five radial passages.

19. An actuator according to claim 16 wherein said piston is axially movable relative to said seal and axial movement of said piston relative to said seal causes a closure of said fluid communication passage.

20. An actuator according to claim 16 wherein said radial passages have a diameter of between 0.5 mm and 1.0 mm.

21. An actuator according to claim 16 wherein said piston and seal form a fast fill facility for said actuator.

* * * * *